No. 678,217. Patented July 9, 1901.
C. A. BARCLAY.
ATTACHMENT FOR THE CURE OF BALKING AND KICKING HORSES.
(Application filed Nov. 30, 1900.)
(No Model.)
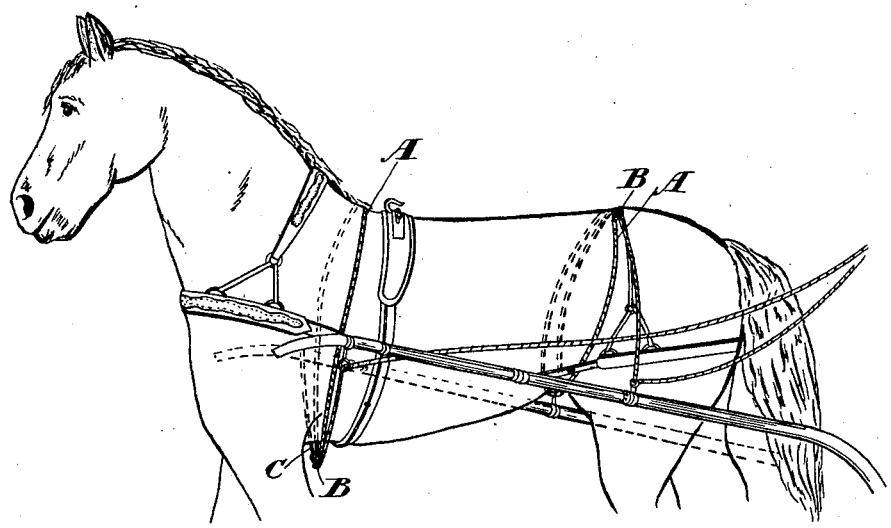
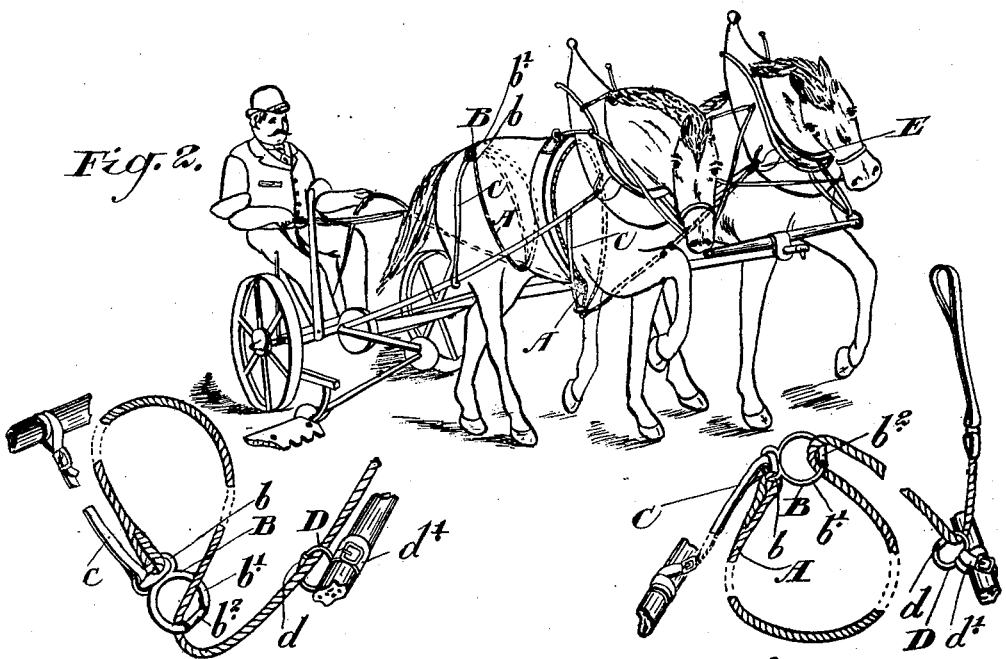
Witnesses
L. Tumble
L. Blackmore
Inventor
C. A. Barclay
THE NORRIS PETERS CO., PHOTO-LITHO., WASHINGTON, D. C.

UNITED STATES PATENT OFFICE.

CHARLES ALBERT BARCLAY, OF BROUGHAM, CANADA.

ATTACHMENT FOR THE CURE OF BALKING AND KICKING HORSES.

SPECIFICATION forming part of Letters Patent No. 678,217, dated July 9, 1901.

Application filed November 30, 1900. Serial No. 38,154. (No model.)

*To all whom it may concern:*

Be it known that I, CHARLES ALBERT BARCLAY, gentleman, of the village of Brougham, in the county of Ontario, in the Province of Ontario, Canada, have invented certain new and useful Improvements in Attachments for the Cure of Balking and Kicking Horses, of which the following is a specification.

My invention relates to improvements in attachments for the cure of balking and kicking horses; and the object of the invention is to devise an extremely simple and suitable device which may be manipulated by the driver of a horse and which will effectually and quickly break him of a balking or a kicking habit; and it consists, essentially, of a rope designed to be placed around the shoulders of a horse to prevent balking and around the abdomen to prevent kicking, such rope being connected to the shaft in single teams and trace in double teams by a suitable strap, the said rope passing around the horse in the form of a loop and through a ring connected to the strap and another ring connected to the shaft, as hereinafter more particularly described.

Figure 1 is a side view of a horse in single harness, showing my device applied both for balking and kicking. Fig. 2 is a view showing my device applied to double harness. Fig. 3 is a view of the device itself, the loop being intermediately broken away and said device in this form being applicable to a balking horse. Fig. 4 shows a reversal of this device when applied to a kicking horse.

In the drawings like letters of reference indicate corresponding parts in each figure.

A is a rope which is connected to one end $b$ of the double ring B. Such ring B is also connected by a strap C to the shaft or trace, as indicated in dotted lines in Fig. 1 and in full lines in Figs. 2 and 3. The rope is passed around the shoulders of the horse in the form of a loop and passes through the larger portion $b'$ of the double ring B, it being essential to provide a friction-roller $b^2$ in order to permit of the ready passage of the rope through the ring portion $b'$. The rope is then passed through a ring D, provided with a friction-roller $d$, against which the rope is designed to move, such ring D being fastened by a suitable strap $d'$ or any other suitable fastening device to the shaft in single harness or to the pole in double harness. The rear end of the rope A in single harness passes back to the vehicle and is manipulated by the driver; but in double harness it is preferably attached, as indicated in Fig. 2, to the hame E. The device which I have now described and the position thereof is that which is required in order to cure a horse from balking. It will be seen that the rope passes around the shoulders and when tightened serves to contract the lungs, brisket, and muscles thereof and also the spine, and will thus prevent free use of same. In fact, I find in practice that the fact of this tightening of the rope inspires fear in the animal, which effectually brings the most unruly into subjection.

It will be seen from what has been before described that the ring B is located underneath the horse; but where I wish to cure a horse from kicking I practically reverse the position of the ring and parts, still, however, attaching the ring B to the shaft or trace. The opposite end of the rope is held in the hand, but the loop is passed around the rump and loin, with the double ring uppermost. It will thus be seen that when such rope is pulled upon and tightened it contracts the muscles of the abdomen and loin and serves to prevent the horse raising itself forwardly to kick. The muscles of the abdomen being contracted prevent the animal kicking with one leg, as the tendency of the horse is more to double himself up or to move the legs forward to relieve the contraction.

My invention is not simply untried, but I have practically demonstrated its utility, and although it is extremely simple it effects the cure of both balking and kicking horses in a very short space of time. Where there is a double team, the one horse, as will be seen from Fig. 2, can be utilized very effectually to control the balking of the other.

What I claim as my invention is—

1. A device of the class described comprising a rope forming a loop adapted to encircle the body of a horse, one end of said rope being secured to a fixed part, a ring also secured to said fixed part through which the rope is passed to form said loop, a guide-ring also secured to a fixed part, the free end of the rope being passed through said guide and being adapted to be pulled upon to contract said loop, substantially as described.

2. A horse balking and kicking controlling device comprising a rope having one end connected to the shaft or trace, a ring secured to said rope, a loop formed by passing the free end of the rope through said ring, a second ring secured to the opposite shaft or trace forming a guide for the free end of the rope, said end being designed to be pulled upon, substantially as described.

3. A horse balking and kicking controlling device comprising a rope, a strap connecting one end of said rope to the shaft or trace, a ring secured to said strap, said rope being formed into a loop by passing the free end of the same through said ring, said free end being designed to be pulled so as to contract the loop and a guiding device secured to the other shaft for the portion of the rope which is designed to be pulled as and for the purpose described.

4. The combination with the holdfast-strap secured at one end to the shaft and the double ring connected with the other end of such strap, of a rope having one end connected to the ring to which the strap is connected, such rope being designed to extend in the form of a loop around the body of the horse and passing through the opposite end of the double ring and a fixed guide through which the free end of the rope is passed as and for the purpose specified.

5. The combination with the holdfast-strap secured at one end to the shaft and the double ring connected with the other end of such strap, of a rope having one end connected to the ring to which the strap is connected, such rope being designed to extend in the form of a loop around the body of the horse and passing through the opposite end of the double ring and a friction-roller on the double ring and a guiding-ring also provided with a friction-roller and secured to the other shaft and designed to form a guiding means for the end of the rope to which the power is applied as and for the purpose specified.

CHARLES ALBERT BARCLAY.

Witnesses:
　PEARL WOODGATE,
　HERB. AVERY.